Patented June 23, 1953

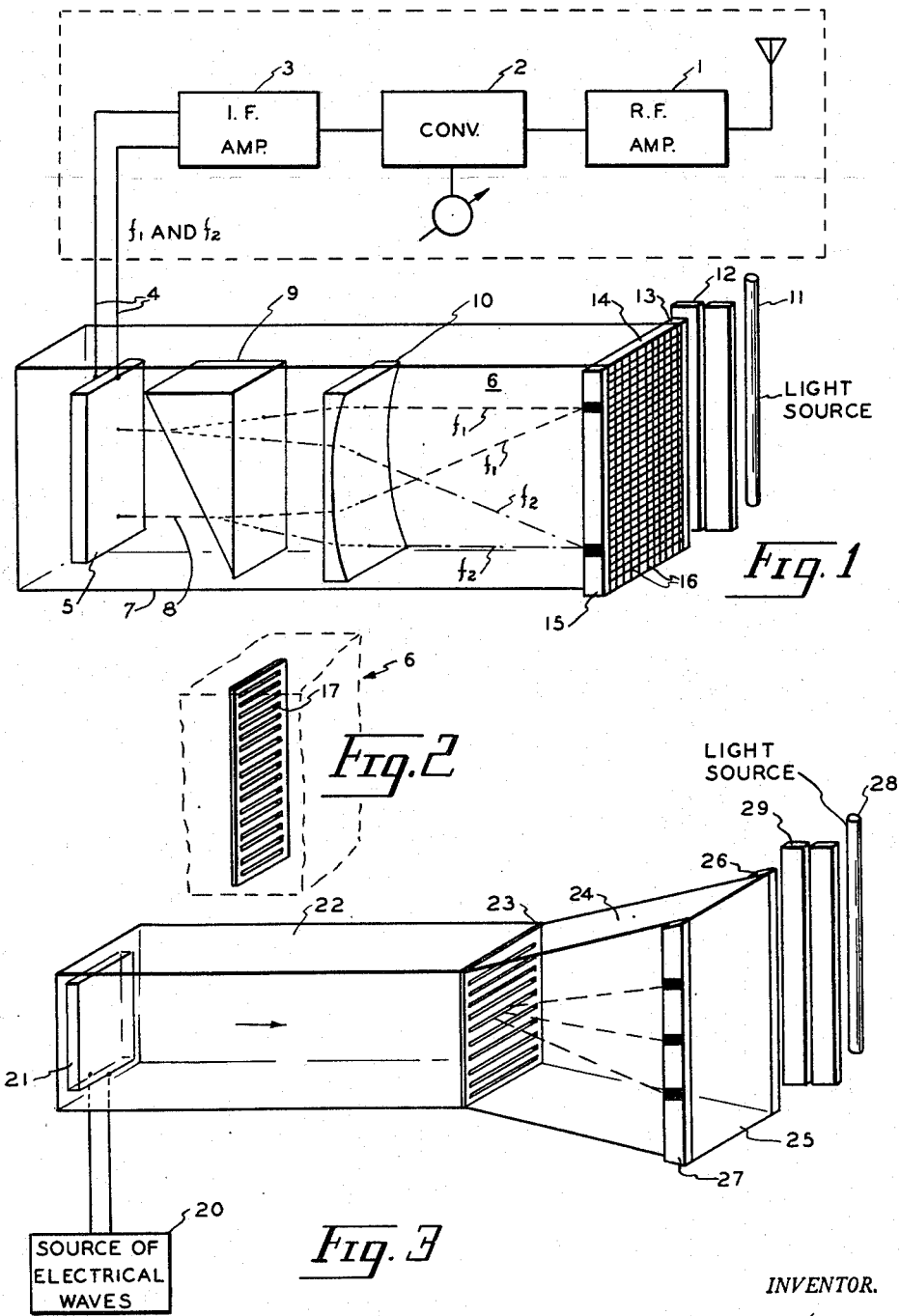

2,643,286

UNITED STATES PATENT OFFICE 2,643,286

SPECTRUM ANALYZER FOR COMPRESSIONAL WAVES

Hyman Hurvitz, Washington, D. C.

Application June 21, 1950, Serial No. 169,503

6 Claims. (Cl. 175—183)

The present invention relates generally to spectrum analyzers, and more particularly to spectrum analyzers for spectra of electrical vibrations and which require a minimum of electronic circuits for accomplishing the analysis.

The principal feature of the invention is the separation of different frequencies in compressional wave bands by virtue of the different propagational velocity which the waves experience in traversing prisms of certain materials and by virtue of the properties of gratings.

An object of the invention resides in the provision of a simplified spectrum analyzer, requiring no devices for examining successive portions of the spectrum to determine the presence of signals in the successive portions, as is true in present day panoramic spectrum analyzers.

A further object of the invention resides in the provision of a spectrum analyzer which is capable of analyzing simultaneously all the frequencies in a predetermined frequency spectrum.

In accordance with the invention, a radio spectrum subject to analysis is transformed into a spectrum of compressional waves in a mechanical medium. The spectrum of compressional waves is directed upon either a body in which the propagation velocity for the waves varies with the frequency of the waves, (or on some other differential diffracting device for such waves). Such a body then possesses the characteristics of a prism in respect to white light. The body may be immersed in a medium which presents substantially constant propagation velocity characteristics for all the different frequency waves under consideration. Preferably the wave propagational velocity in the body and in the medium is substantially equal at an intermediate frequency in the range of frequencies which is utilized. At higher frequencies of that range the wave velocity in the body may exceed that in the medium while at lower frequencies it may be less. Accordingly, the waves of various frequencies, in traversing the body and emerging from it into the medium, experience refractions which are different, and the different frequencies are accordingly dispersed as are the different colors of light rays in passing through a dispersion prism. The separation of the different frequencies may be accentuated by a lens which focuses them onto a plane area, at an angle determined by the frequency. Thereby a plane area exists in which subsists compressional waves of relatively high intensity, different positions in the plane area corresponding with different frequencies of the waves. These positions may be made visible by taking advantage of the fact that under the stresses produced by compressional waves the light propagating characteristics of birefringent media change.

In accordance with a further feature of the invention a diffraction grating may be substituted for the prism.

The invention will be more readily understood from consideration of the following detailed description taken in conjunction with the accompanying drawings, wherein:

Figure 1 illustrates in perspective a spectrum analyzer in accordance with the invention, and employing a prism for frequency separation;

Figure 2 illustrates a fragment of a modification of the system of Figure 1, wherein a grating is employed instead of a prism; and Figure 3 is a simplified modification of the system of Figure 2.

Referring to the drawings, a source of a spectrum of frequencies to be analyzed is provided at 1, and a tunable converter 2 for converting these frequencies to a fixed band of frequencies defined by the pass band of an I. F. amplifier. These frequencies being frequencies of electrical vibrations, are applied via a transmission line 4 to a vibrating crystal 5, which translates the electrical vibrations into mechanical vibrations. The crystal 5 is emersed in a liquid 6, such as water, contained in an elongated narrow container 7, so that the mechanical vibrations of the crystal 5 generate compressional waves in the water, which travel as at 8 toward a refracting prism 9.

The refracting prism may be made of various materials, as is taught in greater detail in U. S. Patent No. 2,423,459 issued to W. P. Mason on July 8, 1947. As is there explained any material which exhibits a different propagational velocity for compressional waves than does the water through which the beam arrives may be used as a refracting prism, the following additional property being desirable, namely, that the propagational velocity for compressional waves in the material varies with the frequency of the waves, since such a material will refract the different frequency compressional waves differently, in a manner similar to that in which a dispersion prism differently refracts different colors of light.

In the present case, then, the prism 9 may be made of Lucite, polystyrene or the like, Lucite being a trade name for methyl methacrylate. If we assume, for example, that the band of frequencies to be analyzed extends from 50 to 200 k. c., at 50 k. c. the velocity of sound in Lucite will be found to be lower than in water, and at 200 k. c., higher, since the velocity of sound in Lucite is approximately the same as the velocity of sound in water at 120 k. c.

The different frequency waves of the band, after refraction by the prism, are directed in different directions from each other but will overlap for a relatively long distance after leaving the prism because of their relatively large cross sectional areas. This effect is augmented by the diverging effects which occur in the beams. In order to overcome this difficulty a super-sonic lens 10 is provided, which may be made of Lucite, and which may be designed to have such characteristics as to focus the various beams on a common plane. Each frequency, accordingly, finds a different focal point along the plane, and if the focal points can be made visible it follows that the spectrum, or the frequency content of the spectrum, may be visually analyzed.

In order to render the focal points visible, account is taken of the fact that at these focal points relatively violent compressional waves exist, while at points slightly separated therefrom such waves exist, if at all, in highly attenuated form.

Accordingly, a source of light 11 is provided which projects a strong beam of light through collimating slits 12, and transversely through the container 7. In the path of the light beam is placed in sequence a polarizer 13, a sheet of Pyrex or glass or quartz 14 subject to impact by the compressional waves, and an analyzer 15. Polarizer 13 and analyzer 15 may be properly oriented sheets of Polaroid or sheet polarizing material properly oriented respectively in respect to their planes of polarization. At areas of compression the birefringence of the sheet of Pyrex, glass or quartz changes, and the analyzer 15 becomes illuminated or its illumination changes. Accordingly, the points at which the compressional waves are focused become readily visible.

A sheet of absorbing material 16 terminates the cell, to avoid reflections.

In Figure 2 is illustrated a diffraction grating 17 for compressional waves, which may be substituted for prism 9, and utilized differentially to diffract the different frequencies of a spectrum. This grating may comprise a metallic sheet having thin slits cut therein and may be readily designed to diffract waves of far higher frequency, extending over a far wider band, than the Lucite prism 9.

Reference is now made to Figure 3 of the accompanying drawings wherein is illustrated a simplified and preferred embodiment of the invention. In the system of Figure 3 the block 20 represents a source of electrical waves in a relatively extended spectrum, which may be derived from a radio frequency receiver, as in the system of Figure 1, or otherwise. The electric waves provided by the source 20 are applied to a crystal 21 which is cemented to or molded within a Lucite block 22, and which accordingly creates compressional waves in the block, which travel in the direction of the arrow, provided in the drawings. Molded within the Lucite block 22 is a diffraction grating 23, which may comprise specifically a sheet of metal having slits therein, the slits having the appropriate widths and spacings to diffract adequately the compressional waves traveling along the Lucite block 22. The Lucite block 22 then diverges, as at 24, to allow for the divergence of the compressional waves as they pass beyond the diffraction grating 23. The waves then diverge after passing through the grating 23 in the Lucite block section 24, in accordance with their frequencies, so that a separation of compressional waves of different frequencies takes place. The Lucite block section 24 may terminate in a substantially flat plane as at 25.

A polarizer 26 and an analyzer 27, which may comprise narrow thin strips of Polaroid or like polarizing material, may be cemented to or molded within the Lucite block section 24 adjacent the plane 25, and on opposite sides thereof, so that the compressional waves traveling along the Lucite block section 24 pass between the polarizer 26 and the analyzer 27 respectively. A source of light 28 is provided, light from which impinges on the polarizer 26 via suitable collimating slits 29, passes through the Lucite transversely of the Lucite section 24, and through the analyzer 27. At those points of the plane 25 where compressional waves occur, birefringent phenomena exist, so that the plane of polarization of the light in passing through the Lucite is varied. Accordingly, if the polarizer 26 and the analyzer 27 are so spaced, that in the absence of birefringent phenomena no light may be visible on the analyzer 27, in the presence of such compressional waves light may be enabled to pass. This light then is visible at a vertical position on the analyzer 27 which is representative of the frequency of the compressional wave which enabled its passage.

Accordingly, the species of Figure 3 represents an extremely simplified embodiment of the invention, involving no liquids, and which may be molded in simple manner of Lucite, or similar plastic material which is capable of responding to compressional waves, and which has the desired birefringent properties, such as Pyrex or glass. If plastic or other material is utilized for the body of the device which does not have the desired birefringent properties, a slab of Pyrex or glass or Lucite may be included at the position between the polarizer 26 and analyzer 27. If desired, an absorbent material, such as copper fillings or screening (not shown) may be utilized to terminate the system by application to the plane 25. By suitably designing the diffraction grating 23 an extremely large separation of adjacent frequencies may be attained, by the simple expedient of extending the vertical dimension of the plane 25, or the angle of divergence of the Lucite block section 24.

By virtue of the construction envisaged in Figure 3, there results a portable device, not easily damaged, not subject to variation of the position of the components in response to vibration, shock or the like, and of extremely simple character, which is capable of the simultaneous analysis of the frequency content of a spectrum.

While I have described and illustrated one specific embodiment of my invention, it will be clear that variations thereof may be resorted to without departing from the true spirit and scope of the invention.

What I claim and desire to secure by Letters Patent of the United States is:

1. A spectrum analyzer for a band of electrical waves comprising a plurality of unknown frequencies, comprising, means for translating said band of electrical waves into a congruent band of compressional waves in a birefringent medium, a diffracting device for differently diffracting the compressional waves of different frequencies into different positions of a pre-assigned plane in said medium, and means for rendering differentially visible the positions of said pre-assigned plane in said medium which are subject to said compressional waves and the positions of said pre-assigned plane which are not so subject, said lost means comprising a polarizer and an analyzer.

2. A spectrum analyzer comprising, a mass of birefringent solid moldable materials capable of transferring compressional waves, means for directing through said mass of solid birefringent moldable material a spectrum of compressional waves of various frequencies, a diffraction grating located in the patch of said waves within said mass of solid birefringent moldable material, for differentially diffracting said waves in accordance with their frequencies, and means for making visible the physical positions of said waves in said material after diffraction of said waves, said last means comprising a polarizer and an analyzer.

3. A spectrum analyzer comprising, a mass of solid birefringent material capable of transferring compressional waves, means for directing through said mass a spectrum of compressional waves of various frequencies, means in said mass for diffracting said compressional waves in said mass in accordance with the frequencies of said compressional waves, and means for making visible the physical locations of the diffracted compressional waves in said material comprising a polarizer and an analyzer located on opposite sides of the paths of said waves in said material.

4. A spectrum analyzer comprising, a mass of birefringent solid moldable materials capable of transferring compressional waves, means for directing into said mass a spectrum of compressional waves of various frequencies, means located in the path of said waves for differentially diffracting said waves in accordance with their frequencies, and means comprising an analyzer and a polarizer located respectively on opposite sides of said path of said waves in said material for making visible the physical positions of said waves after diffraction.

5. The combination in accordance with claim 4 wherein said means for directing comprises a piezo-electric crystal molded in said moldable material.

6. The combination in accordance with claim 4 wherein said means for diffracting comprises a grating molded in said moldable material.

HYMAN HURVITZ.

References Cited in the file of this patent

UNITED STATES PATENTS

| Number | Name | Date |
|---|---|---|
| 2,169,304 | Tournier | Aug. 15, 1939 |
| 2,377,242 | Kent | May 29, 1945 |
| 2,418,964 | Arenberg | Apr. 15, 1947 |
| 2,455,389 | Soller | Dec. 7, 1948 |